(12) United States Patent
Shalowitz et al.

(10) Patent No.: US 12,069,061 B2
(45) Date of Patent: Aug. 20, 2024

(54) CREATING SHARED VIRTUAL SPACES

(71) Applicant: Meta Platforms Technologies, LLC, Menlo Park, CA (US)

(72) Inventors: Ilana Orly Shalowitz, Oakland, CA (US); Ashley Gustafson, Surprise, AZ (US); Laura Mary Phelps Blum, Fort Collins, CO (US); Jessica Kitchens, Sacramento, CA (US); Hilary Hayes, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 317 days.

(21) Appl. No.: 17/475,163

(22) Filed: Sep. 14, 2021

(65) Prior Publication Data
US 2023/0078578 A1    Mar. 16, 2023

(51) Int. Cl.
| H04L 29/06 | (2006.01) |
| G02B 27/01 | (2006.01) |
| G06T 19/20 | (2011.01) |
| H04L 9/40 | (2022.01) |
| H04L 67/131 | (2022.01) |

(52) U.S. Cl.
CPC .......... *H04L 63/102* (2013.01); *G02B 27/017* (2013.01); *G06T 19/20* (2013.01); *H04L 67/131* (2022.05); *G06T 2219/2021* (2013.01)

(58) Field of Classification Search
CPC ... H04L 63/102; H04L 67/131; G02B 27/017; G06T 19/20
USPC .......................................................... 726/4
See application file for complete search history.

(56) References Cited

U.S. PATENT DOCUMENTS

| 2013/0342564 A1* | 12/2013 | Kinnebrew ............ G09G 3/003 |
| | | 345/619 |
| 2014/0132595 A1* | 5/2014 | Boulanger .............. G06T 7/564 |
| | | 345/619 |
| 2019/0018479 A1* | 1/2019 | Minami ................... G06F 3/013 |

FOREIGN PATENT DOCUMENTS

| EP | 2400464 A2 | 12/2011 |
| EP | 3223116 A1 | 9/2017 |
| WO | 2011109126 A1 | 9/2011 |

OTHER PUBLICATIONS

International Search report and Written Opinion for International Application No. PCT/US2022/043375, mailed Jan. 2, 2023, 12 pages.

(Continued)

*Primary Examiner* — Kambiz Zand
*Assistant Examiner* — Phuc Pham
(74) *Attorney, Agent, or Firm* — McDermott Will & Emery LLP

(57) ABSTRACT

Methods, systems, and storage media for creating and/or providing shared virtual spaces are disclosed. Exemplary implementations may: provide and/or create a virtual space capable of being modified by multiple authorized users, the virtual space having an exterior perimeter defining an interior area, and the interior area having at least one volumetrically-mapped virtual item therein; receive a modification to the virtual item(s) from a first authorized user; and store the modification of the virtual item(s) in association with the virtual space such that the modification is persistent and shared among all authorized users unless and until another modification is made to the virtual item by an authorized user.

18 Claims, 5 Drawing Sheets

(56) References Cited

OTHER PUBLICATIONS

Montaya L., et al., "Remote Collaboration with Augmented and Virtual Reality Interfaces," International Conference On Computer Graphics & Virtual Reality, Jan. 1, 2007, pp. 81-86.

* cited by examiner

CREATING SHARED VIRTUAL SPACES

TECHNICAL FIELD

The present disclosure generally relates to creating virtual spaces. More particularly, the present disclosure relates to creating virtual spaces configured to be shared and interacted with by multiple users.

BACKGROUND

Augmented and/or virtual reality has intrigued and fascinated people for generations. With advances in technology in more recent years what used to be seen by many merely as something out of a science fiction novel and non-attainable has, in many instances, become reality. With the use of augmented and/or virtual reality wearables (e.g., glasses, goggles, or the like) and/or other devices capable of projecting virtual images, it can appear as though images (objects, persons, etc.) are in the same physical locale as a user, even when the user is otherwise alone. In some instances, a user can be made to feel as though s/he is in a different physical location altogether and interacting with persons and objects that, in physical reality, are not present in the user's surroundings.

BRIEF SUMMARY

The subject disclosure provides for systems and methods for creating virtual spaces. More particularly, the subject disclosure relates to creating virtual spaces configured to be shared by multiple users, each of whom is authorized to interact with and make persistent modifications to the shared virtual spaces.

One aspect of the present disclosure relates to a computer-implemented method for creating shared virtual spaces. The method may include providing a virtual space capable of being modified by multiple authorized users, the virtual space having an exterior perimeter defining an interior area, and the interior area having at least one volumetrically-mapped virtual item therein. The method may include receiving a modification to the at least one volumetrically-mapped virtual item from a first authorized user of the multiple authorized users. The method may include storing the modification of the at least one volumetrically-mapped virtual item in association with the virtual space.

Another aspect of the present disclosure relates to a system configured for creating shared virtual spaces. The system may include one or more hardware processors configured by machine-readable instructions. The processor(s) may be configured to generate a virtual space capable of being modified by multiple authorized users, the virtual space having an exterior perimeter defining an interior area, the interior area having at least one volumetrically-mapped virtual item therein. The processor(s) may be configured to receive a modification to the at least one volumetrically-mapped virtual item from a first authorized user of the multiple authorized users. The processor(s) may be configured to store the modification to the at least one volumetrically-mapped virtual item in association with the virtual space.

Yet another aspect of the present disclosure relates to a non-transient computer-readable storage medium having instructions embodied thereon, the instructions being executable by one or more processors to perform a method for creating shared virtual spaces. The method may include receiving a request to create a shared virtual space. The method may include receiving input that describes a location of a virtual exterior perimeter around a physical space, the virtual exterior perimeter defining a virtual interior area. The method may include generating the virtual exterior perimeter around the physical space. The method may include receiving input that describes at least one physical item in the physical space. The method may include volumetrically mapping the at least one physical item to create a virtual item in the virtual interior area. The method may include receiving identifications for a plurality of authorized users each of whom is authorized to modify the shared virtual space. The method may include creating the shared virtual space as the virtual interior area having the volumetrically-mapped item therein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
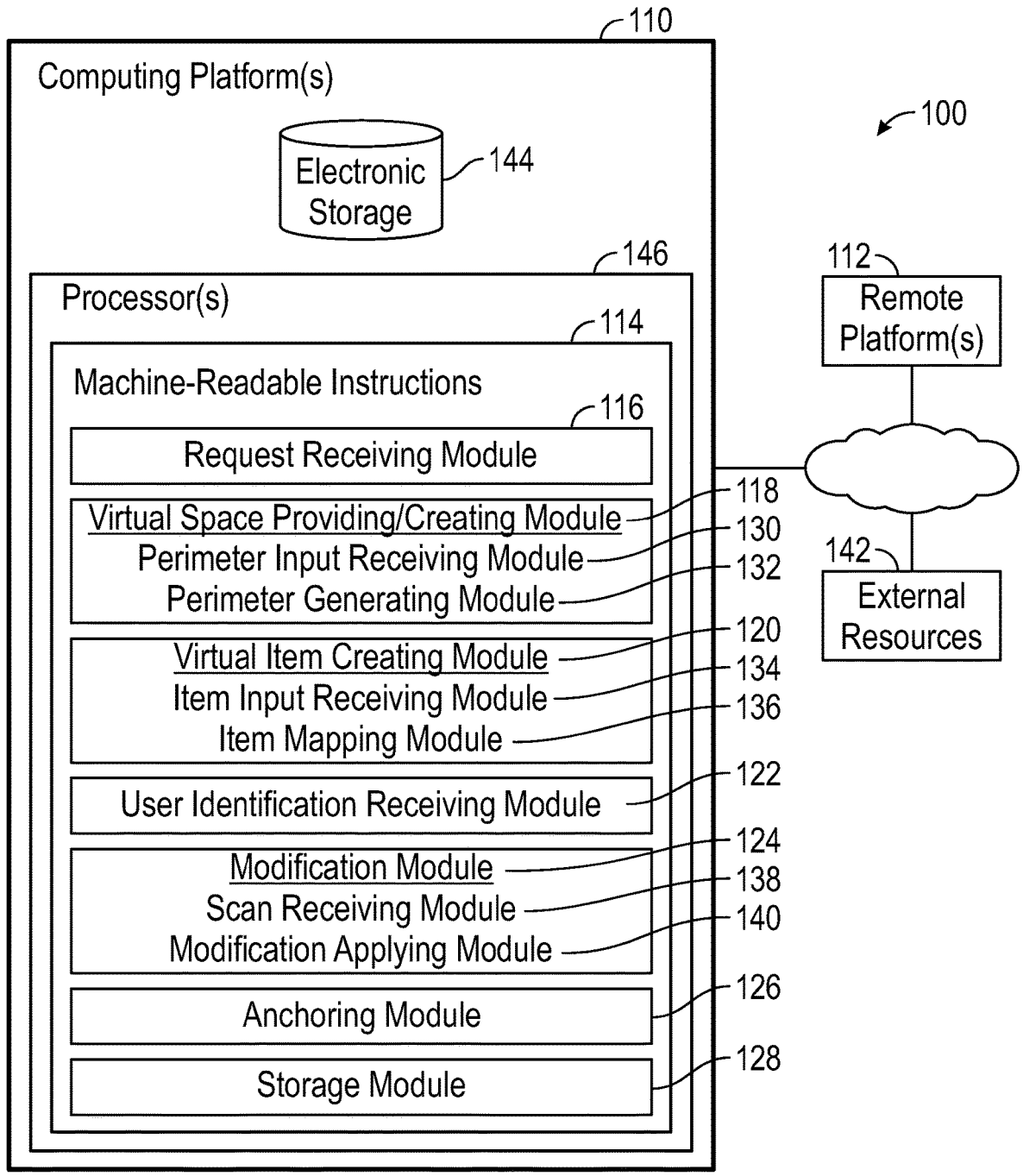
FIG. 1 illustrates a system configured for creating and/or providing shared virtual spaces, in accordance with one or more implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As previously described, augmented and/or virtual reality has intrigued and fascinated people for decades. With more recent advances in technology what used to be seen by many merely as something out of a science fiction novel has, in many instances, become reality. With the use of augmented and/or virtual reality wearables (e.g., glasses, goggles, or the like) and/or other devices capable of projecting virtual images (for instance, as holograms), it can appear as though images (objects, persons, etc.) are in the same physical locale as a user, even when the user is otherwise alone. In some instances, a user can be made to feel as though s/he is in a different physical location altogether and interacting with persons and objects that, in reality, are not present in the user's physical surroundings.

While such technological advances have gone a long way to making the science fiction of the past more of a reality for the present, there still exist many limitations that make the use of such technologies impractical and/or not useful in certain circumstances. By way of example, while persons having the appropriate wearables and/or devices can, in the moment, be made to feel as though they are in a collaborative environment, once they leave the environment, any alterations or additions made to the environment may be lost. In other instances, alterations and/or additions may be saved and a separate modified environment created. However, such is laborious for the users who may have difficulty recalling which environment is the most recently modified environment, particularly when a user has several environments in which s/he collaborates with various other users.

The subject disclosure provides for systems and methods for creating and/or providing shared virtual spaces. In aspects, a virtual space may be created and/or provided, the virtual space being capable of being shared among and modified by multiple authorized users. In aspects, the created and/or provided virtual space may include an exterior perimeter defined in reference to a corresponding physical space. In aspects, the exterior perimeter may define an interior area. In aspects, the interior area may include at least one virtual item therein that has been volumetrically-mapped from a physical item in the corresponding physical space. In aspects, a modification to the at least one virtual item may be received from a first authorized user of the multiple authorized users. In aspects, the modification may be stored in association with the virtual space such that it is persistent and shared among all authorized users unless and until another modification is made by an authorized user that alters the previous change.

Aspects of the present disclosure relate to a new paradigm for creating collaborative virtual spaces. This is advantageous because persons can be made to feel as though they are physically interacting with their friends, family and/or peers even when they may be half a world away. For example, in a workplace environment, persons from offices in different cities, states, or even countries can interact with one another as though they were physically in the same workplace environment and any collaborative work product may be stored such that it is readily available to next time one or more of the users wishes to return to the virtual space. In this way users can independently or collaboratively enter a virtual space (e.g., workplace), view alterations made by other authorized users, make modifications of their own, if desired, and be confident that all such modifications will persist and be seen by other authorized users as appropriate.

In aspects, two or more authorized users may enter a shared virtual space from the same physical location. For instance, an office building may include a designated room for creating and/or providing shared virtual spaces for various collaborative groups. In aspects, two or more authorized users may enter a shared virtual space from different physical locations. For instance, two users may have rooms with substantially similar furniture and furniture arrangement such that both users may experience a substantially similar virtual shared space from two separate locations. Any and all such variations, and any combination thereof, are contemplated to be within the scope of embodiments of the present disclosure.

FIG. 1 illustrates a system 100 configured for creating and/or providing virtual spaces to be interacted with and shared among multiple authorized users, according to certain aspects of the disclosure. In some implementations, system 100 may include one or more computing platforms 110. Computing platform(s) 110 may be configured to communicate with one or more remote platforms 112 according to a client/server architecture, a peer-to-peer architecture, and/or other architectures. Remote platform(s) 112 may be configured to communicate with other remote platforms via computing platform(s) 110 and/or according to a client/server architecture, a peer-to-peer architecture, and/or other architectures. Users may access system 100 via remote platform(s) 112.

Computing platform(s) 110 may be configured by machine-readable instructions 114. Machine-readable instructions 114 may include one or more instruction modules. The instruction modules may include computer program modules. The instruction modules may include one or more of request receiving module 116, virtual space creating/providing module 118 (including perimeter input receiving module 130 and perimeter generating module 132), virtual item creating module 120 (including item input receiving module 134 and item mapping module 136), user identification receiving module 122, modification module 124 (including scan receiving module 138 and modification applying module 140), anchoring module 126, storage module 128, and/or other instruction modules.

Request receiving module 116 may be configured to receive a request to create and/or provide a shared virtual space. In aspects, request receiving module 116 may be configured to receive a request to create a new shared virtual space. In aspects, request receiving module 116 may be configured to receive a request to recall and provide an already existing shared virtual space to an authorized user.

Figure 2A:
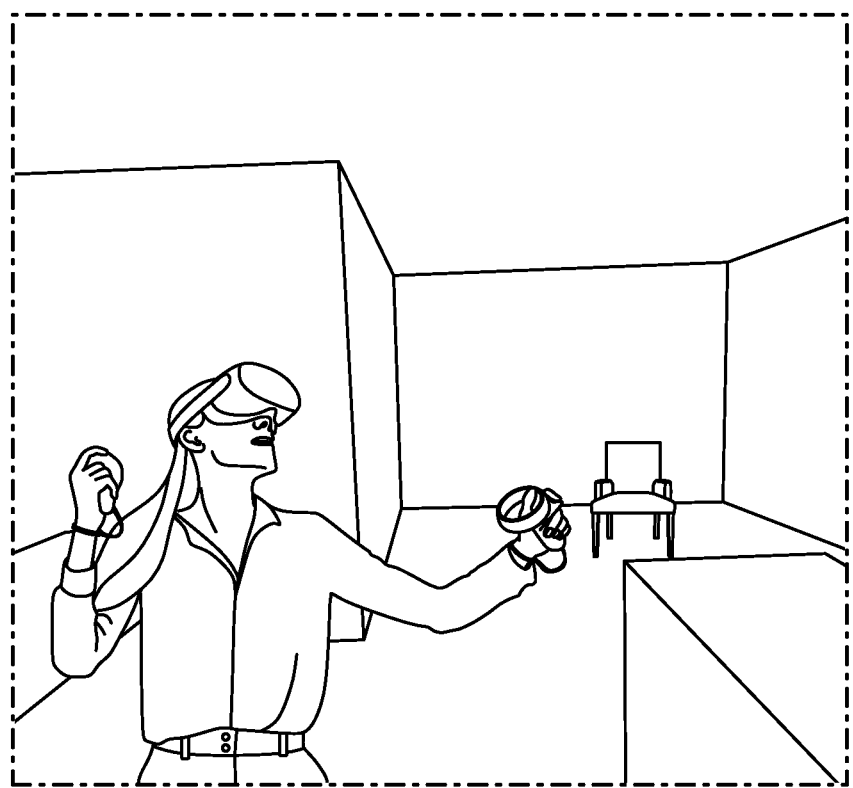
FIG. 2A illustrates an exemplary virtual space having an exterior perimeter, an interior area and a virtual item therein, according to certain aspects of the present disclosure.

Virtual space creating/providing module 118 may be configured to create and/or provide a requested virtual space. By way of non-limiting example, and with reference to FIG. 2A, illustrated is an exemplary virtual space 200, according to certain aspects of the present disclosure. Components comprising the exemplary virtual space 200 are more fully described below with reference to various modules which may be included in the system 100 of FIG. 1. In aspects, virtual space creating/providing module 118 may be configured to recall and provide an already existing shared virtual space to an authorized user. In aspects, virtual space creating/providing module 118 may be configured to verify a requesting user's identity as an authorized user prior to recalling and providing an already existing shared virtual space to the requesting user.

In aspects, virtual space creating/providing module 118 may be configured to create a new shared virtual space. In this regard, virtual space creating/providing module 118 includes a perimeter input receiving module 130 and a perimeter generating module 132.

The perimeter input receiving module 130 may be configured to receive input that describes a location of a virtual exterior perimeter about a physical space. By way of non-limiting example, and with reference to FIG. 2A, exemplary virtual space 200 includes a virtual exterior perimeter 212 about a corresponding physical space. In aspects, a user may utilize a virtual and/or augmented reality device or wearable (e.g., virtual reality goggles 214 worn by an exemplary user in FIG. 2A) to specify, in relation to the user's physical environment, a virtual exterior perimeter (i.e., a desired exterior perimeter for the shared virtual space) around a physical space and provide such specifications as input to perimeter input receiving module 130. (Though shown in FIG. 2A as a virtual reality wearable device, it will be understood by those having ordinary skill in the relevant art that any virtual reality device, wearable, or the like may be utilized within the scope of embodiments of the present disclosure.)

Perimeter generating module 132 may be configured to generate a virtual exterior perimeter utilizing the input (e.g., location specifications) received by perimeter input receiving module 130. Methods and devices for specifying and generating perimeters for virtual and/or augmented reality environments is known to those having ordinary skill in the art and, accordingly, are not further described herein. In aspects, a perimeter generated by perimeter generating module 110 may include a virtual interior area bounded by the perimeter. With reference to FIG. 2A, exemplary virtual space 200 includes a virtual interior area 214 bounded by virtual exterior perimeter 212.

Virtual and/or augmented environments that provide a collaborative environment in accordance with aspects of the present disclosure may leverage items (e.g., furniture items) that are present in the physical environment to which a virtual interior area corresponds. In this regard, virtual item creating module 120 may be configured to map physical items present within physical environments corresponding to bounded virtual interior areas to shared virtual spaces. In aspects, virtual item creating module 120 may be configured to include an item input receiving module 134 and an item mapping module 136.

Item input receiving module 134 may be configured to receive input from a virtual and/or augmented reality device or wearable that specifies, in relation to a user's physical environment, a location, size and/or volume specifications for one or more items within a virtual interior area bounded by a virtual exterior perimeter. By way of non-limiting example, the item input receiving module 134 may receive location coordinates, linear size specifications, and/or volume specifications for an item (e.g., a chair or a table) that is present in the physical space to which a virtual interior area corresponds.

Item mapping module 136 may be configured to utilize input received by the item input receiving module 134 to map items from the physical environment to the shared virtual space. In aspects, the item input receiving module 134 may be configured to spatially map items from the physical environment to the shared virtual space. In aspects, the item input receiving module 112 may be configured to volumetrically map items from the physical environment to the shared virtual space. Any and all such variations, and any combination thereof, are contemplated to be within the scope of embodiments of the present disclosure. By way of non-limiting example, an item (e.g., a chair) present in the physical environment corresponding to a virtual interior area may be volumetrically mapped to a shared virtual space by the item mapping module 136. With reference to FIG. 2A, exemplary virtual space 200 includes a volumetrically mapped item 216 (i.e., a chair) mapped to the virtual interior area 214 bounded by the virtual exterior perimeter 212. Methods and devices for mapping physical items to virtual spaces with which such physical items correspond is known to those having ordinary skill in the art and, accordingly, are not further described herein. In accordance with aspects of the present disclosure, volumetrically mapping items not only allows users to avoid negative interactions with physical items present in the physical environments to which virtual interior areas correspond, but also allows users to leverage such items for collaborative interactions, as more fully described below.

User identification receiving module 122 may be configured to receive identifying information for a plurality of users that are authorized to interact with a shared virtual space. Such identifying information may include, by way of non-limiting example, one or more of a user name, an online user identifier, a user's security level, or the like. In aspects, one or more users for whom identifying information is received may be authorized to modify a shared virtual space. In aspects, all users authorized to share a particular virtual space may be permitted to make the same types and/or levels of modifications to the shared virtual space. In aspects, different authorized users may be permitted to make modifications to the shared virtual space of different types and/or levels. In aspects, the modifications permitted to be made by different authorized users may be determined by the users' security levels and/or other categorical designations.

Modification module 124 may be configured to receive input describing one or more desired modifications to a shared virtual space and/or to make such desired modifications to a shared virtual space. In this regard, modification module 124 may include a scan receiving module 138 and/or a modification applying module 140. Scan receiving module 138 may be configured to receive a scan of a virtual item present in a shared virtual space to which a user desires to make one or more modifications. By way of non-limiting example, and with reference to FIG. 2A, scan receiving module 138 may be configured to receive a scan of an item (e.g., chair 216) present in the virtual interior area 214 defined by the virtual exterior perimeter 212 of the shared virtual space 200. In aspects, scans may be executed by virtual and/or augmented reality wearables 218 and/or devices 220 and received by scan receiving module 116.

Figure 2B:
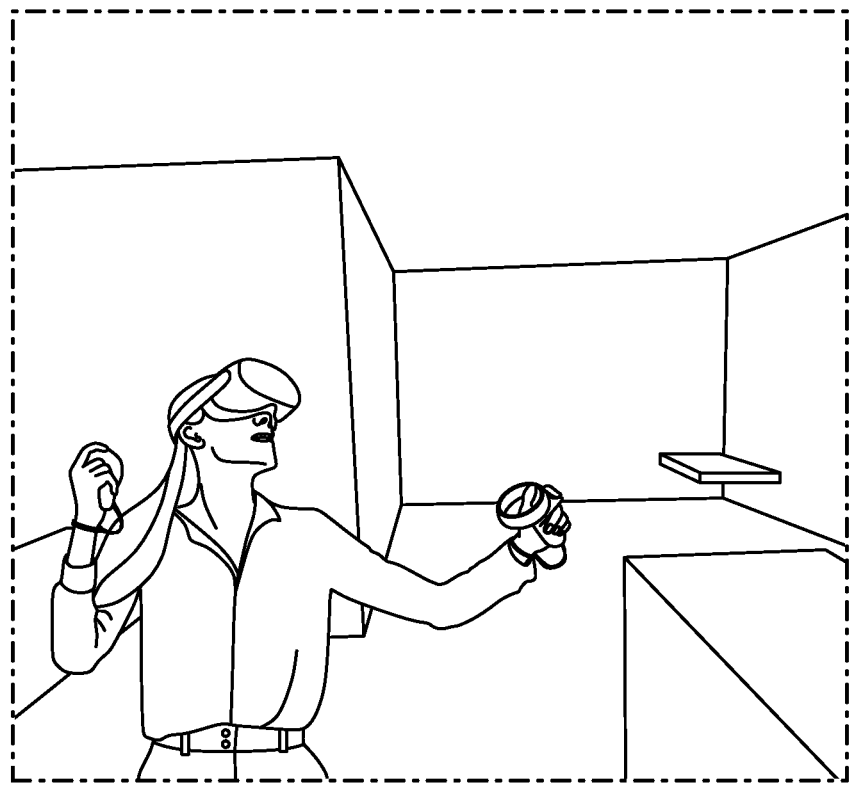
FIG. 2B illustrates the exemplary virtual space of FIG. 2A with a modification to the virtual item, according to certain aspects of the present disclosure.

Modification applying module 140 may be configured to receive one or more desired modifications to a scan received by scan receiving module 138 and apply such modifications to the shared virtual space. By way of non-limiting example, modification applying module 140 may be configured to receive input (from an authorized user) specifying that it is desired that an item (e.g., a chair) present in an interior area of a shared virtual space be modified to take on a different form (e.g., a whiteboard) and to make the desired modification. With reference to FIG. 2B, and by way of non-limiting example, modification applying module 140 may be configured to receive input (from an authorized user) specifying that it is desired that the chair 216 present in the virtual interior area 214 of the exemplary virtual space 200 be modified to take on a different form, for instance, that of a whiteboard 222.

Anchoring module 126 may be configured to use a volumetrically-mapped item as an anchor point for a virtual item within the virtual space. In aspects, anchoring module 126 may be configured to use a volumetrically-mapped item as an anchor point for a virtual item within the virtual space that does not have a corresponding physical item in the physical space that corresponds to the virtual space. By way of non-limiting example, and with reference to FIG. 3, the chair 216 present in the virtual interior area 214 of the exemplary virtual space 200 may be used as an anchor point for the virtual chess board 310. In aspects, the virtual chess board 310 does not have a corresponding physical item in the physical space that corresponds to the virtual space 200. Because the chair 216 is used as an anchor point in FIG. 3, if the location of the chair is modified by an authorized user, the location of the virtual chess board 310 also will change such that the relative position of the chair 216 and the virtual chess board 310 remains consistent.

Storage module 128 may be configured to store created and/or modified shared virtual spaces. In aspects, storage module 128 may be configured to automatically store modifications to shared virtual spaces as such modifications are made. In aspects, storage module 128 may be configured to store modifications to shared virtual spaces in accordance with predefined time intervals. In aspects, storage module 128 may be configured to store modifications to shared virtual spaces upon affirmative user action requesting that one or more modifications be stored. Any and all such variations, and any combination thereof, are contemplated to be within the scope of embodiments of the present disclosure. In aspects, storage module 128 may be configured to store shared virtual spaces and/or any modifications thereto to the cloud.

In some implementations, computing platform(s) 110, remote platform(s) 112, and/or external resources 142 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 110, remote platform(s) 112, and/or external resources 142 may be operatively linked via some other communication media.

A given remote platform 112 may include one or more processors configured to execute computer program modules. The computer program modules may be configured to enable an expert or user associated with the given remote platform 112 to interface with system 100 and/or external resources 142, and/or provide other functionality attributed herein to remote platform(s) 112. By way of non-limiting example, a given remote platform 112 and/or a given computing platform 110 may include one or more of a server, a desktop computer, a laptop computer, a handheld computer, a tablet computing platform, a NetBook, a Smartphone, a gaming console, and/or other computing platforms.

External resources 142 may include sources of information outside of system 100, external entities participating with system 100, and/or other resources. In some implementations, some or all of the functionality attributed herein to external resources 142 may be provided by resources included in system 100.

Computing platform(s) 110 may include electronic storage 144, one or more processors 146, and/or other components. Computing platform(s) 110 may include communication lines, or ports to enable the exchange of information with a network and/or other computing platforms. Illustration of computing platform(s) 110 in FIG. 1 is not intended to be limiting. Computing platform(s) 110 may include a plurality of hardware, software, and/or firmware components operating together to provide the functionality attributed herein to computing platform(s) 110. For example, computing platform(s) 110 may be implemented by a cloud of computing platforms operating together as computing platform(s) 110.

Electronic storage 144 may comprise non-transitory storage media that electronically stores information. The electronic storage media of electronic storage 144 may include one or both of system storage that is provided integrally (i.e., substantially non-removable) with computing platform(s) 110 and/or removable storage that is removably connectable to computing platform(s) 110 via, for example, a port (e.g., a USB port, a firewire port, etc.) or a drive (e.g., a disk drive, etc.). Electronic storage 144 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 144 may include one or more virtual storage resources (e.g., cloud storage, a virtual private network, and/or other virtual storage resources). Electronic storage 144 may store software algorithms, information determined by processor(s) 146, information received from computing platform(s) 110, information received from remote platform(s) 112, and/or other information that enables computing platform(s) 110 to function as described herein.

Processor(s) 146 may be configured to provide information processing capabilities in computing platform(s) 110. As such, processor(s) 146 may include one or more of a digital processor, an analog processor, a digital circuit designed to process information, an analog circuit designed to process information, a state machine, and/or other mechanisms for electronically processing information. Although processor(s) 146 is shown in FIG. 1 as a single entity, this is for illustrative purposes only. In some implementations, processor(s) 146 may include a plurality of processing units. These processing units may be physically located within the same device, or processor(s) 146 may represent processing functionality of a plurality of devices operating in coordination. Processor(s) 146 may be configured to execute modules 116, 118, 120, 122, 124, 126, 128, and/or other modules. Processor(s) 146 may be configured to execute modules 116, 118, 120, 122, 124, 126, and/or 128, and/or other modules by software; hardware; firmware; some combination of software, hardware, and/or firmware; and/or other mechanisms for configuring processing capabilities on processor(s) 146. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 116, 118, 120, 122, 124, 126 and/or 128 are illustrated in FIG. 1 as being implemented within a single processing unit, in implementations in which processor(s) 146 includes multiple processing units, one or more of modules 116, 118, 120, 122, 124, 126, and/or 128 may be implemented remotely from the other modules. The description of the functionality provided by the different modules 116, 118, 120, 122, 124, 126, and/or 128 described below is for illustrative purposes, and is not intended to be limiting, as any of modules 116, 118, 120, 122, 124, 126, and/or 128 may provide more or less functionality than is described. For example, one or more of modules 116, 118, 120, 122, 124, 126, and/or 128 may be eliminated, and some or all of its functionality may be provided by other ones of modules 116, 118, 120, 122, 124, 126, and/or 128. As another example, processor(s) 146 may be configured to execute one or more additional modules that may perform some or all of the functionality attributed below to one of modules 116, 118, 120, 122, 124, 126, and/or 128.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
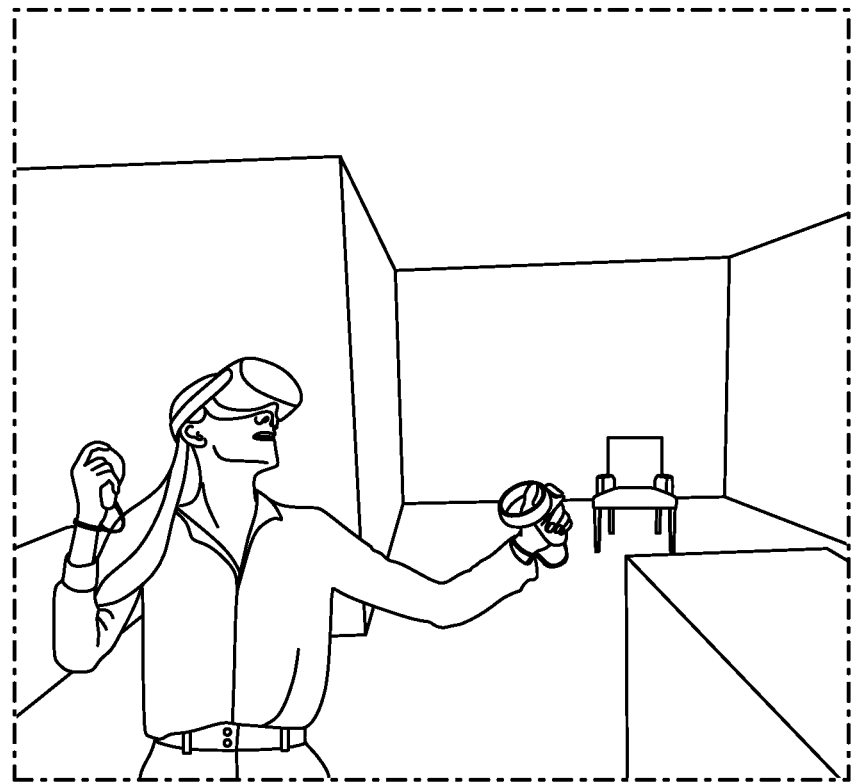
FIG. 3 illustrates an exemplary virtual space having a virtual item that is volumetrically-mapped from a physical item as an anchor point for a virtual item that does not have a corresponding physical item, according to certain aspects of the present disclosure.
Figure 4:
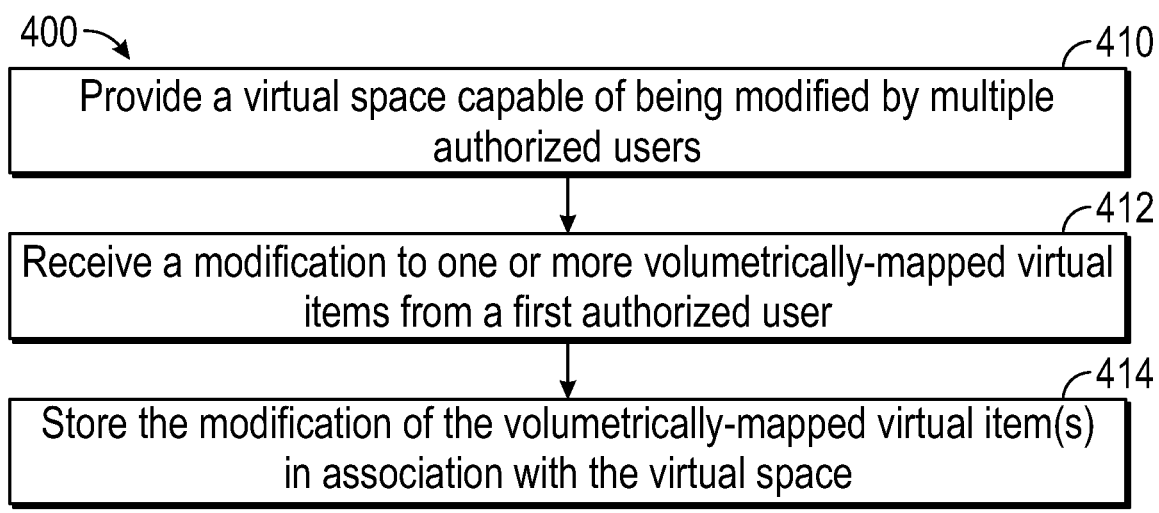
FIG. 4 illustrates an exemplary flow diagram for creating and/or providing shared virtual spaces, according to certain aspects of the disclosure.

Turning now to FIG. 4, illustrated is an exemplary flow diagram (e.g., process 400) for creating and/or providing shared virtual spaces, according to certain aspects of the disclosure. For explanatory purposes, the exemplary process 400 is described herein with reference to FIGS. 1, 2A, 2B and 3. Further for explanatory purposes, the steps of the exemplary process 400 are described herein as occurring in serial, or linearly. However, multiple instances of the exemplary process 400 may occur in parallel.

At step 410, the process 400 may include providing a virtual space capable of being modified by multiple authorized users (e.g., through virtual space providing/creating module 118 of the system 100 of FIG. 1). According to an aspect, the virtual space includes an exterior perimeter (e.g., virtual exterior perimeter 212 of the exemplary virtual space 200 of FIGS. 2A and 2B) defining an interior area (e.g., virtual interior area 214 of the exemplary virtual space 200 of FIGS. 2A and 2B). According to an aspect, the interior area includes at least one volumetrically-mapped virtual item therein (e.g., the volumetrically mapped chair 216 of FIG. 2A).

At step 412, the process 400 may include receiving a modification to the at least one volumetrically-mapped virtual item from a first authorized user of the multiple authorized users (e.g., through modification module 124 of the system 100 of FIG. 1).

At step 414, the process 400 may include storing the modification of the at least one volumetrically-mapped virtual item in association with the virtual space (e.g., through storage module 128 of the system 100 of FIG. 1) such that the modification is persistent and shared among all authorized users unless and until another modification is made to the virtual item by an authorized user.

Figure 5:
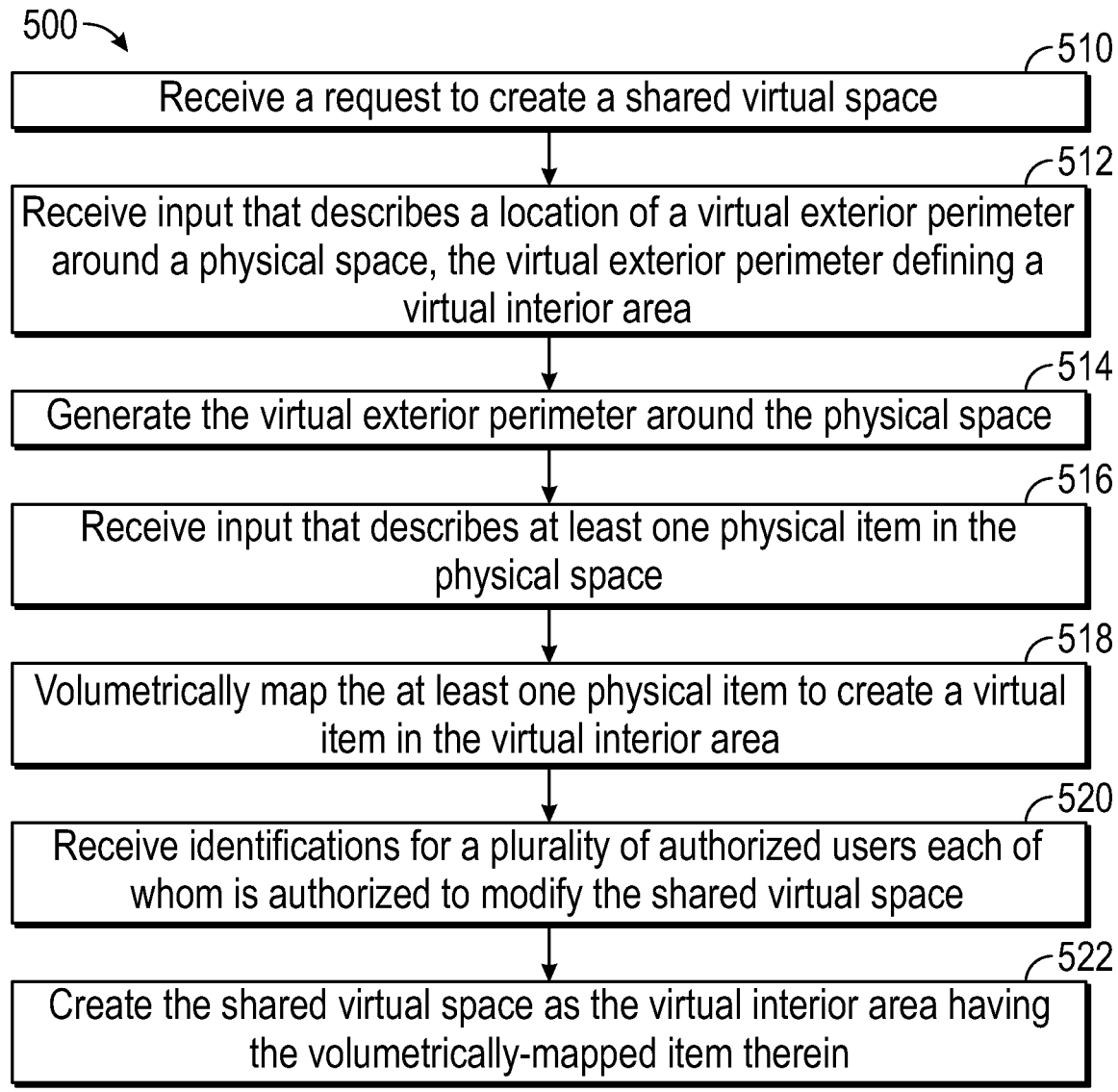
FIG. 5 illustrates an exemplary flow diagram for creating and/or providing shared virtual spaces, according to certain aspects of the disclosure.

With reference now to FIG. 5, illustrated is an exemplary flow diagram (e.g., process 500) for creating shared virtual spaces, according to certain aspects of the disclosure. For explanatory purposes, the exemplary process 500 is described herein with reference to FIGS. 1, 2A, 2B and 3. Further for explanatory purposes, the steps of the exemplary process 500 are described herein as occurring in serial, or linearly. However, multiple instances of the exemplary process 500 may occur in parallel.

At step 510, the process 500 may include receiving a request to create a shared virtual space (e.g., through request receiving module 116 of the system 100 of FIG. 1).

At step 512, the process 500 may include receiving input that describes a location of a virtual exterior perimeter about a physical space (e.g., through perimeter input receiving module 130 of the virtual space providing/creating module 118 of the system 100 of FIG. 1). According to an aspect, the virtual exterior perimeter (e.g., virtual exterior perimeter 212 of the exemplary virtual space 200 of FIGS. 2A, 2B and 3) defines a virtual interior area (e.g., virtual interior area 214 of the exemplary virtual space 200 of FIGS. 2A and 2B).

At step 514, the process 500 may include generating the virtual exterior perimeter (e.g., virtual exterior perimeter 212 of the exemplary virtual space 200 of FIGS. 2A, 2B and 3) around the physical space (e.g., through perimeter generating module 110 of the virtual space providing/creating module 118 of the system 100 of FIG. 1).

At step 516, the process 500 may include receiving input that describes at least one physical item (e.g., a chair) in the physical space (e.g., through item input receiving module 112 of the virtual item creating module 120 of the system 100 of FIG. 1).

At step 518, the process 500 may include volumetrically mapping the at least one physical item to create a virtual item (e.g., the volumetrically-mapped chair 216 of the exemplary virtual space 200 of FIG. 2A) in the virtual interior area (e.g., virtual interior area 214 of the virtual space 200 of FIG. 2A), for instance, through the item mapping module 114 of the virtual item creating module 120 of the system 100 of FIG. 1.

At step 520, the process 500 may include receiving identifications for a plurality of authorized users (e.g., through the user identification receiving module 122 of the system 100 of FIG. 1). According to an aspect, each authorized user is authorized to modify the shared virtual space.

At step 522, the process 500 may include creating the shared virtual space as the virtual interior area having the volumetrically-mapped item therein (e.g., through the virtual space providing/creating module 132 of the system 100 of FIG. 1).

Figure 6:
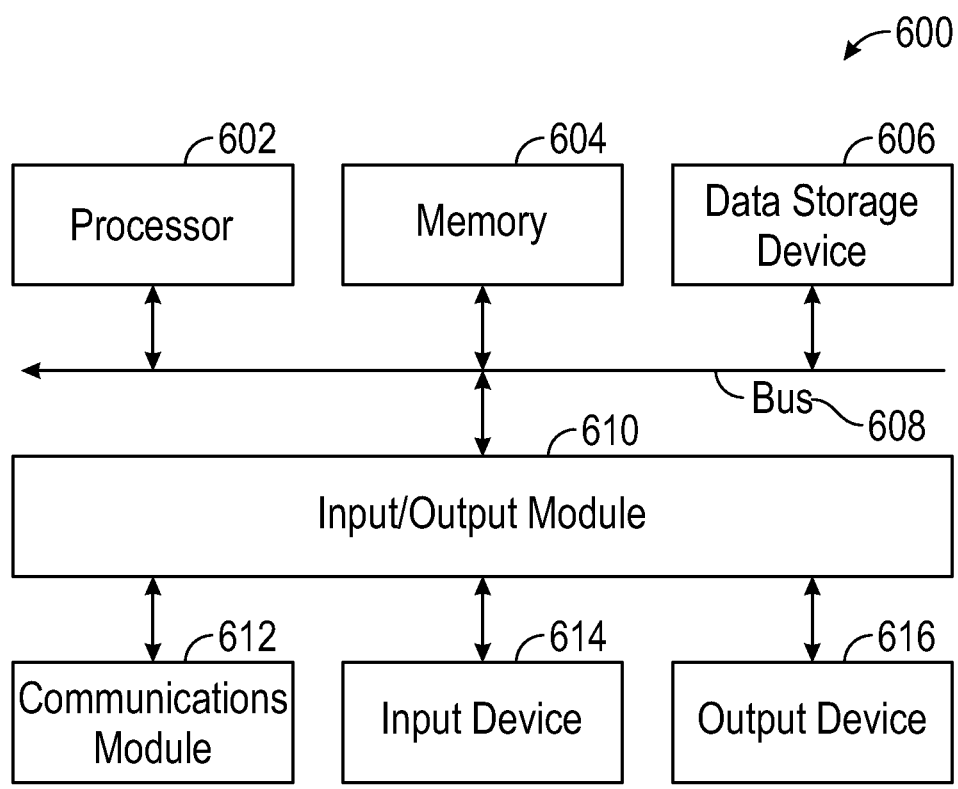
FIG. 6 is a block diagram illustrating an exemplary computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 500 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as a LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads data and provides a shared virtual space, information may be read from the data and stored in a memory device, such as the memory 604. Additionally, data from the memory 604 servers accessed via a network the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for creating shared virtual spaces, the method comprising:
providing a virtual space capable of being modified by multiple authorized users, the virtual space having an exterior perimeter defining an interior area, and the interior area having at least one volumetrically-mapped virtual item therein;
receiving a modification to the at least one volumetrically-mapped virtual item from a first authorized user of the multiple authorized users, wherein the at least one volumetrically-mapped virtual item is configured to be used as an anchor point, such that a location change of the at least one volumetrically-mapped virtual item re-orients the virtual space consistent with the location change; and
storing the modification of the at least one volumetrically-mapped virtual item in association with the virtual space.

2. The computer-implemented method of claim 1, further comprising:
receiving a scan of the at least one volumetrically-mapped virtual item;
applying the received modification of the at least one volumetrically-mapped virtual item to the scan to create a modified scan; and
storing the modified scan in association with the virtual space.

3. The computer-implemented method of claim 1, further comprising:
receiving a request from a second authorized user of the multiple authorized users to enter the virtual space;
providing the virtual space with the at least one volumetrically-mapped item having the modified scan applied thereto; and
permitting the second authorized user to enter the virtual space.

4. The computer-implemented method of claim 1, wherein the second authorized user is permitted to enter the virtual space at a same time as the first authorized user.

5. The computer-implemented method of claim 1, wherein the second authorized user is permitted to enter the virtual space at a different time than the first authorized user.

6. The computer-implemented method of claim 1, wherein the virtual space is configured to be entered by the first authorized user from a first physical location, and wherein the virtual space is configured to be entered by the second authorized user from a second physical location that is different from the first physical location.

7. The computer-implemented method of claim 1, wherein the virtual space is configured to be entered by at least a portion of the multiple authorized users from the same physical location.

8. A system configured for creating shared virtual spaces, the system comprising: one or more hardware processors configured by machine-readable instructions to:
- generate a virtual space capable of being modified by multiple authorized users, the virtual space having an exterior perimeter defining an interior area, the interior area having at least one volumetrically-mapped virtual item therein;
- receive a modification to the at least one volumetrically-mapped virtual item from a first authorized user of the multiple authorized users, wherein the at least one volumetrically-mapped virtual item is configured to be used as an anchor point, such that a location change of the at least one volumetrically-mapped virtual item re-orients the virtual space consistent with the location change; and
- store the modification to the at least one volumetrically-mapped virtual item in association with the virtual space.

9. The system of claim 8, wherein the one or more processors further are configured by the machine-readable instructions to:
- receive a scan of the at least one volumetrically-mapped virtual item;
- apply the received modification of the at least one volumetrically-mapped virtual item to the scan to create a modified scan; and
- store the modified scan in association with the bounded virtual space.

10. The system of claim 8, wherein the one or more processors further are configured by the machine-readable instructions to:
- receive a request from a second authorized user of the multiple authorized users to enter the virtual space;
- provide the virtual space with the at least one volumetrically-mapped item having the modified scan applied thereto; and
- permit the second authorized user to enter the virtual space.

11. The system of claim 10, wherein the second authorized user is permitted to enter the virtual space at a same time as the first authorized user.

12. The system of claim 10, wherein the second authorized user is permitted to enter the virtual space at a different time than the first authorized user.

13. The system of claim 10, wherein the virtual space is configured to be entered by the first authorized user from a first physical location, and wherein the virtual space is configured to be entered by the second authorized user from a second physical location that is different from the first physical location.

14. The system of claim 10, wherein the virtual space is configured to be entered by at least a portion of the multiple authorized users from the same physical location.

15. A non-transient computer-readable storage medium having instructions embodied thereon, the instructions being executable by one or more processors to perform a method for creating shared virtual spaces, the method comprising:
- receiving a request to create a shared virtual space;
- receiving input that describes a location of a virtual exterior perimeter around a physical space, the virtual exterior perimeter defining a virtual interior area;
- generating the virtual exterior perimeter around the physical space;
- receiving input that describes at least one physical item in the physical space;
- volumetrically mapping the at least one physical item to create a virtual item in the virtual interior area, wherein the virtual item is configured to be used as an anchor point for the virtual space, such that a location change of the virtual item re-orients the virtual space consistent with the location change;
- receiving identifications for a plurality of authorized users each of whom is authorized to modify the shared virtual space; and
- creating the shared virtual space as the virtual interior area having the volumetrically-mapped item therein.

16. The computer storage medium of claim 15, wherein the method further comprises:
- receiving a modification to the virtual item from a first user of the plurality of authorized users; and
- storing the modification to the virtual item in association with the shared virtual space.

17. The computer storage medium of claim 15, wherein the method further comprises:
- receiving a scan of the virtual item;
- receiving the modification to the scan to create a modified scan; and
- storing the modified scan of the virtual item in association with the shared virtual space.

18. The computer storage medium of claim 15, wherein the method further comprises:
- receiving a request for a second authorized user of the plurality of authorized users to enter the shared virtual space;
- providing the virtual space with the virtual item having the modification; and
- permitting the second authorized user to enter the shared virtual space.

* * * * *